US012593871B2

(12) United States Patent
An

(10) Patent No.: US 12,593,871 B2
(45) Date of Patent: Apr. 7, 2026

(54) AEROSOL-GENERATING DEVICE

(71) Applicant: KT&G CORPORATION, Daejeon (KR)

(72) Inventor: Hwikyeong An, Seoul (KR)

(73) Assignee: KT&G Corporation, Daejeon (KR)

( * ) Notice: Subject to any disclaimer, the term of this patent is extended or adjusted under 35 U.S.C. 154(b) by 345 days.

(21) Appl. No.: 18/024,235

(22) PCT Filed: Jun. 22, 2022

(86) PCT No.: PCT/KR2022/008893
§ 371 (c)(1),
(2) Date: Mar. 1, 2023

(87) PCT Pub. No.: WO2022/270918
PCT Pub. Date: Dec. 29, 2022

(65) Prior Publication Data
US 2024/0023605 A1 Jan. 25, 2024

(30) Foreign Application Priority Data

Jun. 23, 2021 (KR) ........................ 10-2021-0081229

(51) Int. Cl.
*A24F 40/40* (2020.01)
*A24F 40/60* (2020.01)
*F16J 15/02* (2006.01)

(52) U.S. Cl.
CPC .............. *A24F 40/40* (2020.01); *A24F 40/60* (2020.01); *F16J 15/02* (2013.01)

(58) Field of Classification Search
CPC ................................. A24F 40/40; A24F 40/60
See application file for complete search history.

(56) References Cited

U.S. PATENT DOCUMENTS

2014/0144762 A1* 5/2014 Cheong .................. H01H 13/06
200/302.2
2019/0261690 A1* 8/2019 Lin ..................... H01M 50/213
(Continued)

FOREIGN PATENT DOCUMENTS

CN 209403593 U 9/2019
CN 210869883 U 6/2020
(Continued)

OTHER PUBLICATIONS

PCT International Application No. PCT/KR2022/008893, International Search Report dated Sep. 22, 2022, 2 pages.
(Continued)

*Primary Examiner* — Michael H. Wilson
*Assistant Examiner* — Jennifer A Kessie
(74) *Attorney, Agent, or Firm* — Foley & Lardner LLP

(57) ABSTRACT

An aerosol-generating device is disclosed. The aerosol-generating device of the disclosure includes An aerosol-generating device comprising: a body with a buttonhole; a button key configured to be inserted into the buttonhole; a circuit board disposed inside the body to face button key; a seal disposed between the circuit board and the body, wherein the seal comprises a central portion positioned to face the button key and a peripheral portion surrounding a periphery of the buttonhole and in contact with the body; an actuator mounted between the circuit board and the central portion of the seal to provide elastic force to the central portion toward the button key; and a support projecting from the circuit board toward the peripheral portion for supporting the peripheral portion.

14 Claims, 13 Drawing Sheets

(56) References Cited

U.S. PATENT DOCUMENTS

| | | | |
|---|---|---|---|
| 2020/0113241 A1* | 4/2020 | Liu ........................ A24F 40/40 |
| 2020/0359707 A1 | 11/2020 | Liu | |
| 2021/0052013 A1 | 2/2021 | Mabee et al. | |
| 2021/0114867 A1 | 4/2021 | Duqi et al. | |

FOREIGN PATENT DOCUMENTS

| | | |
|---|---|---|
| CN | 212277061 U | 1/2021 |
| JP | 2001-239077 | 9/2001 |
| JP | 2002-034784 | 2/2002 |
| JP | 2003-347757 | 12/2003 |
| JP | 2007-095577 | 4/2007 |
| JP | 2017-054578 | 3/2017 |
| KR | 10-2014-0068388 | 6/2014 |
| KR | 10-1934714 | 1/2019 |
| RU | 148581 | 12/2014 |
| RU | 201058 | 11/2020 |
| WO | 2012031100 | 3/2012 |
| WO | 2012160164 | 11/2012 |

OTHER PUBLICATIONS

Japan Patent Office Application No. 2023-516273, Office Action dated May 28, 2024, 4 pages.
Russian Federation Federal Service for Intellectual Property, Patents and Trademarks Application Serial No. 2023109082/03, Office Action dated Aug. 25, 2023, 7 pages.
European Search Report dated May 15, 2025, on European Patent appl. No. 22828765.2.
Chinese Office Action dated Jan. 31, 2026, on Chinese Patent Appl. No. 202280006789.4.

\* cited by examiner

【FIG. 1】
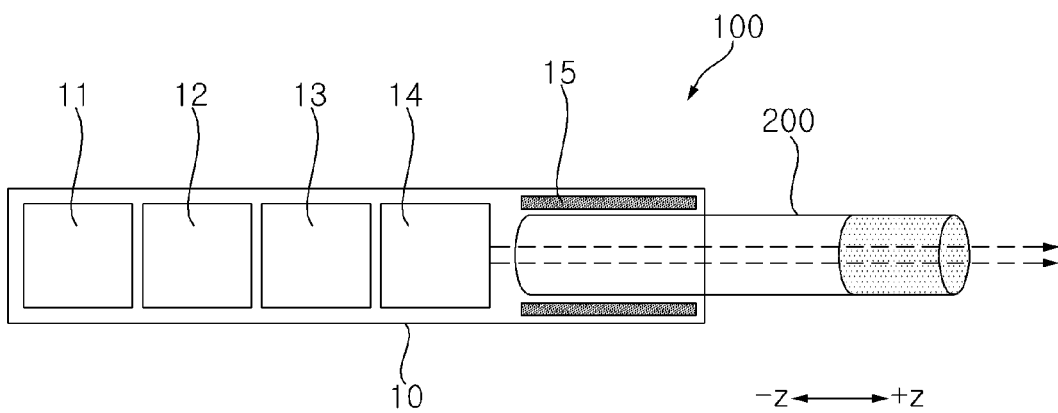

【FIG. 2】
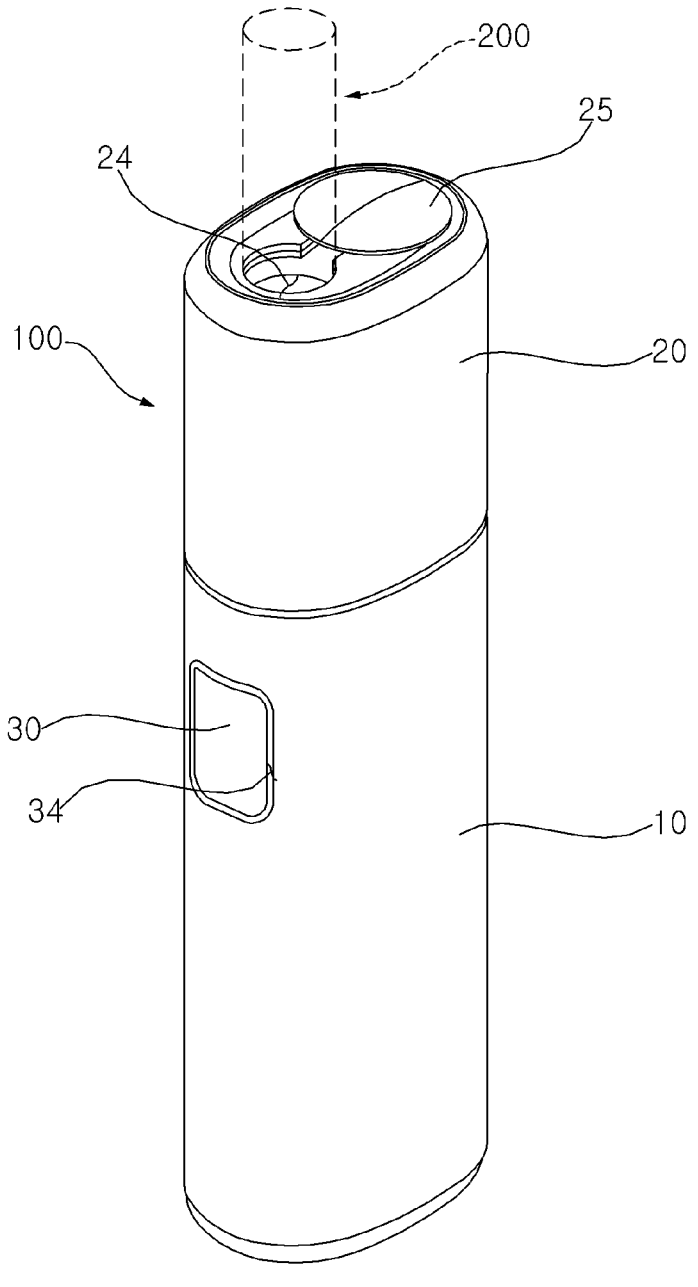

【FIG. 3】
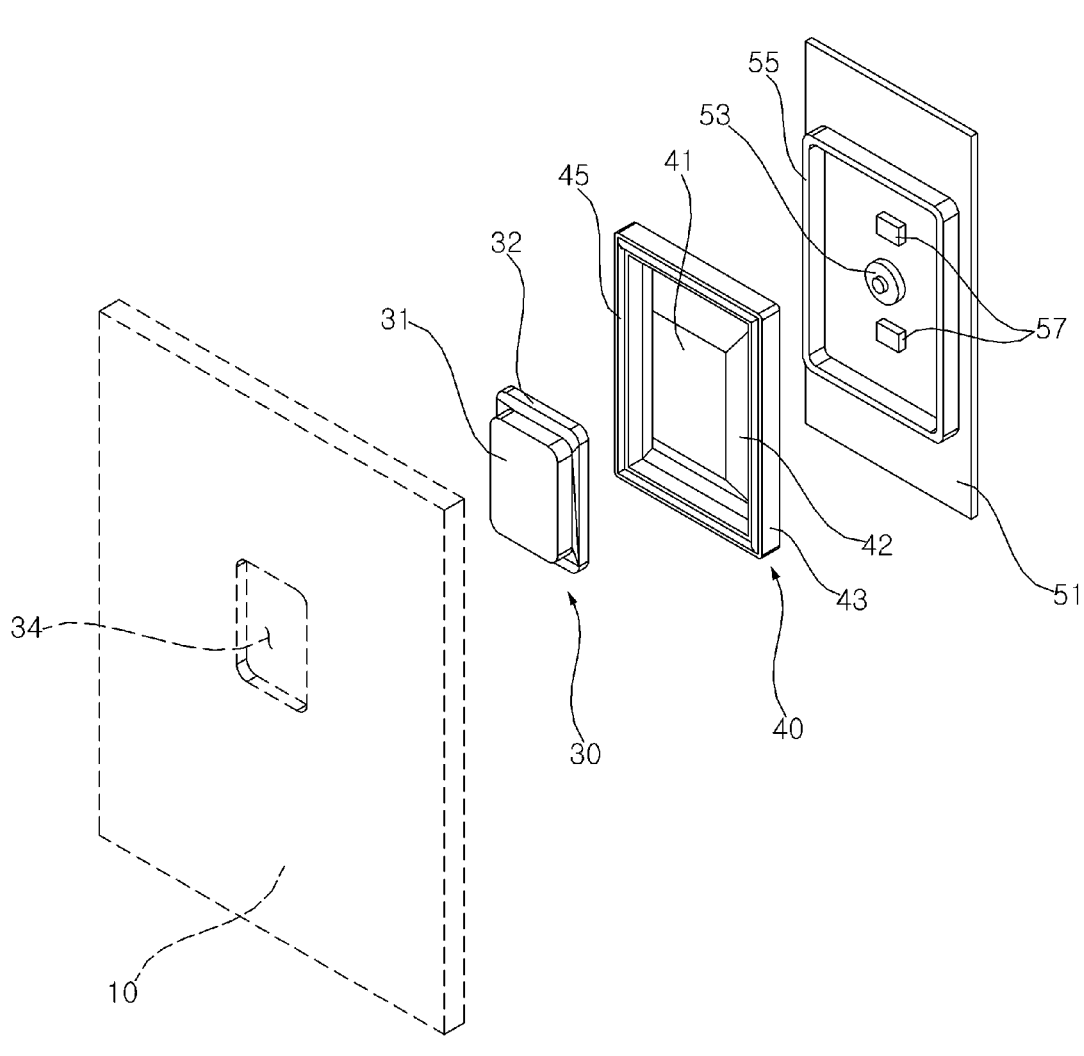

【FIG. 4】
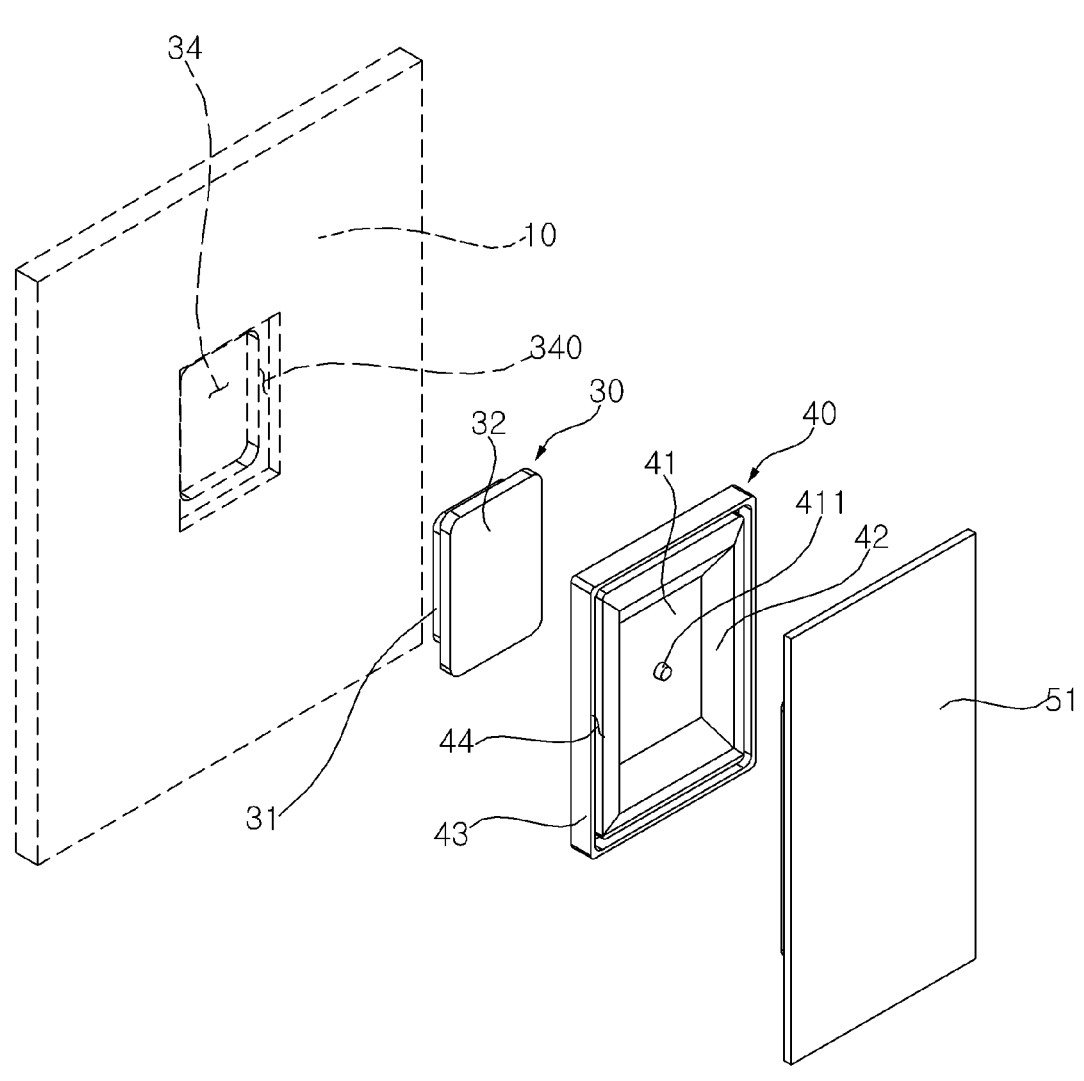

【FIG. 5】
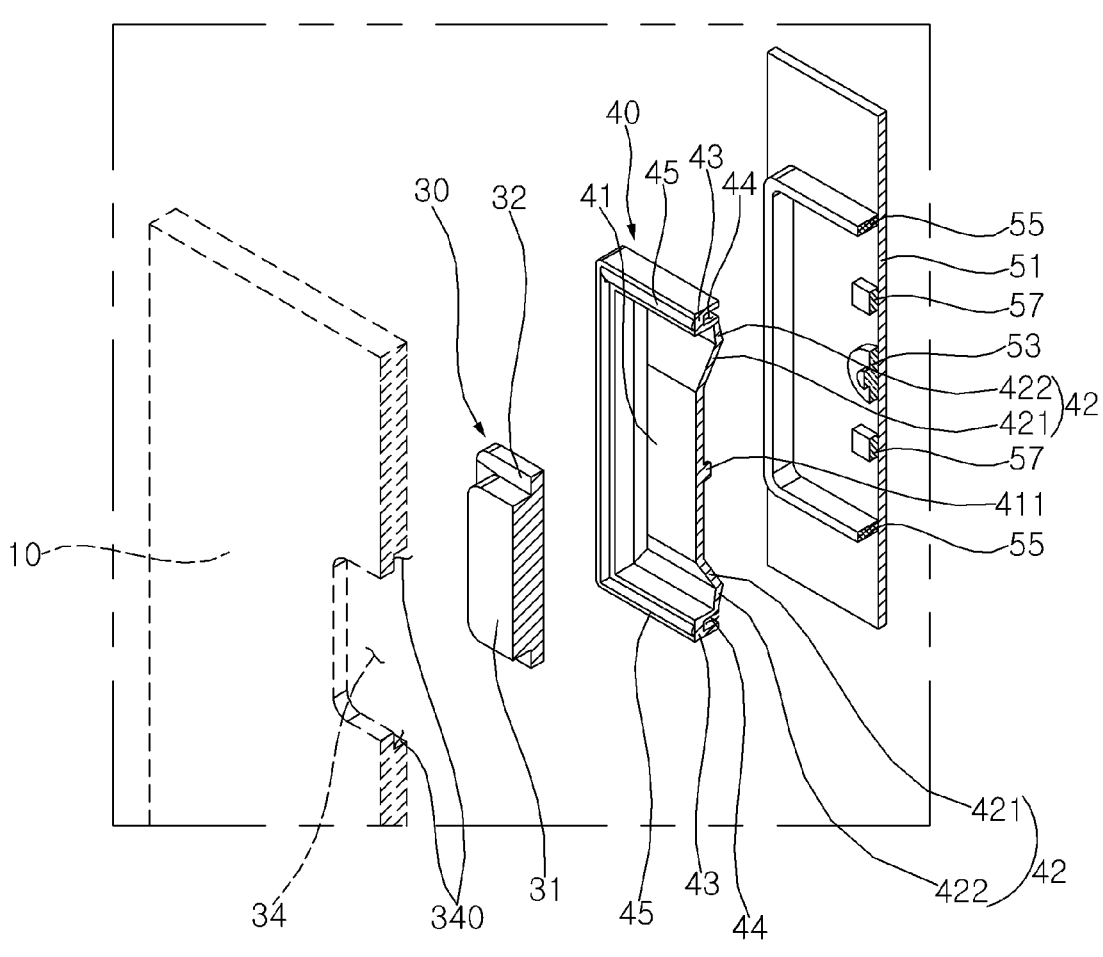

【FIG. 6】
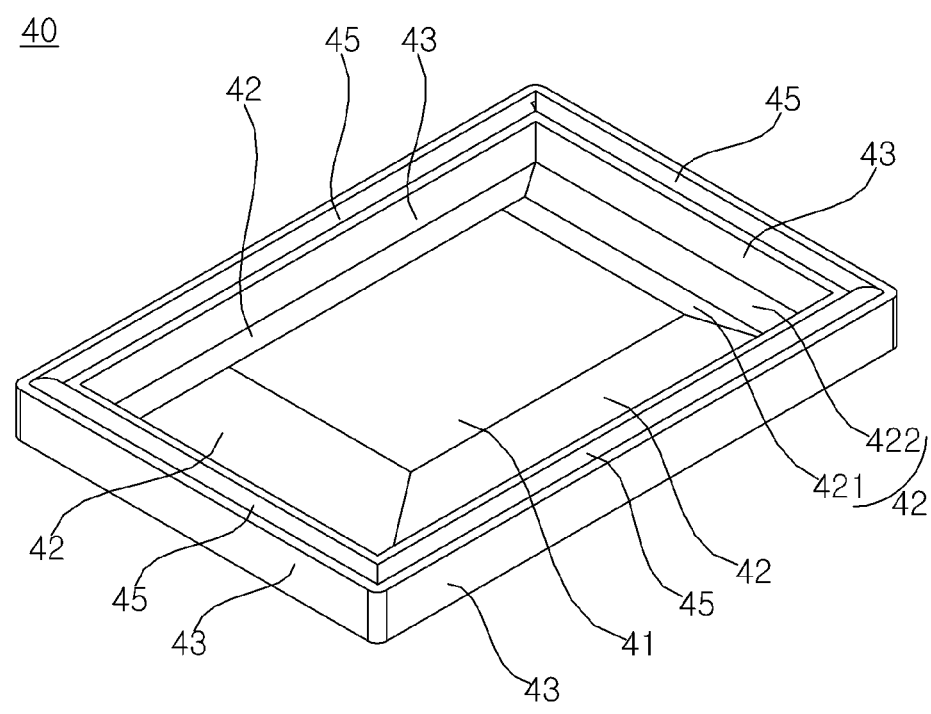

【FIG. 7】
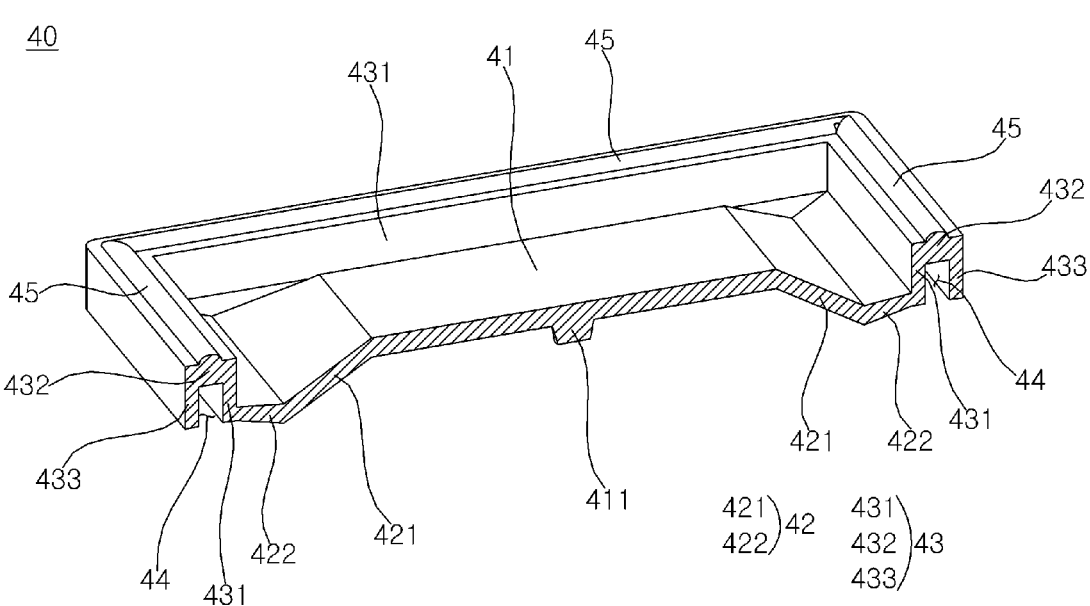

【FIG. 8】
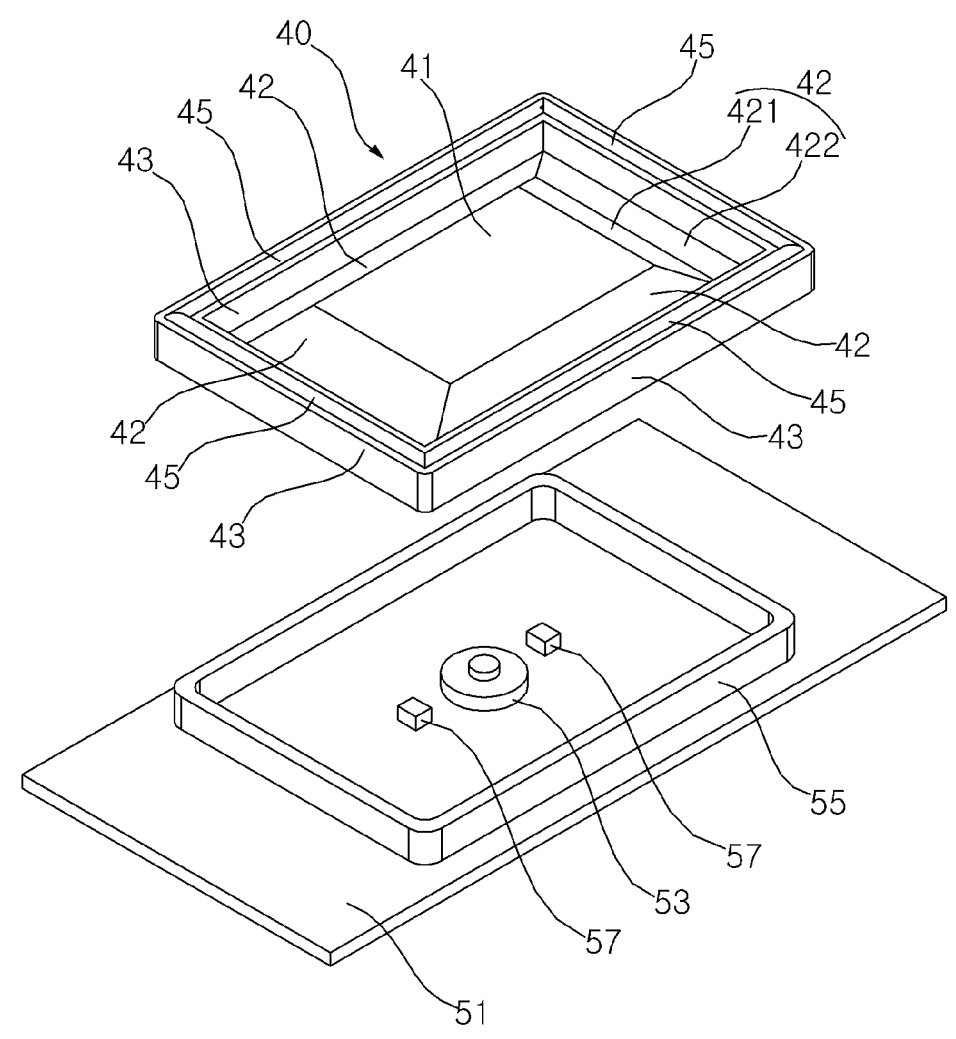

【FIG. 9】
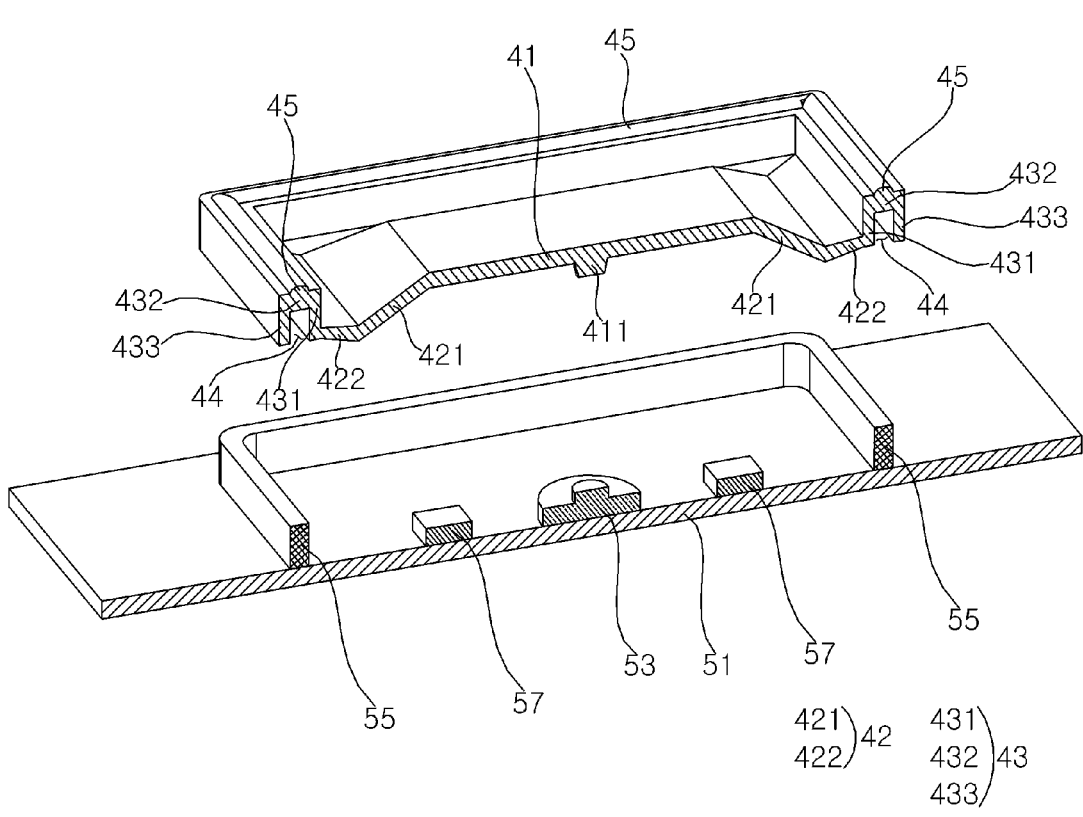

【FIG. 10】
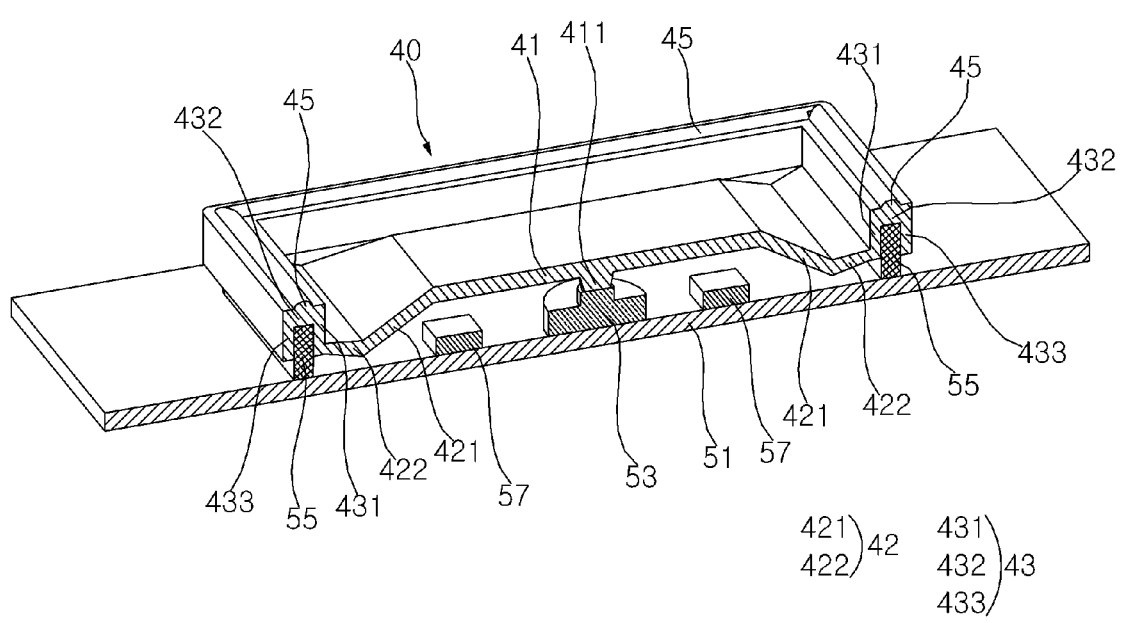

【FIG. 11】
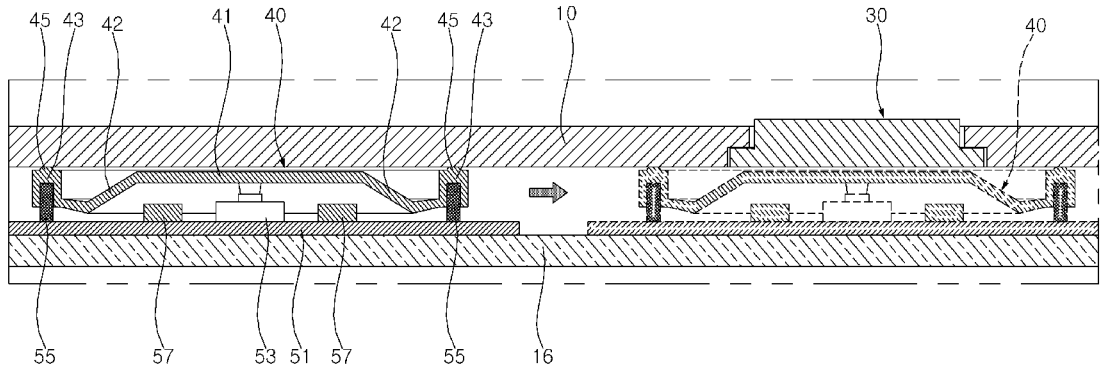

【FIG. 12】
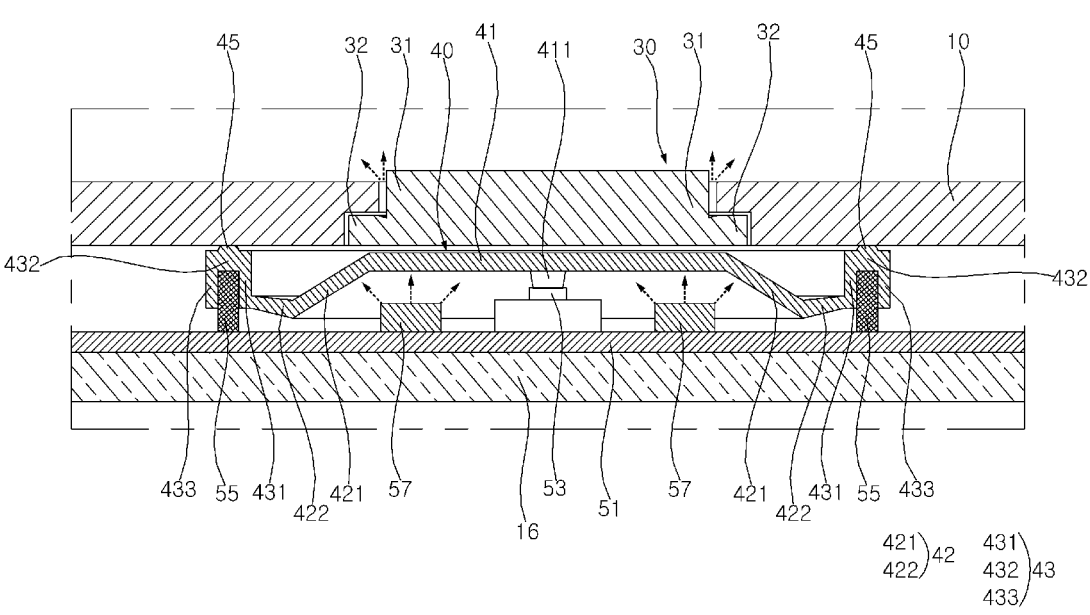

【FIG. 13】
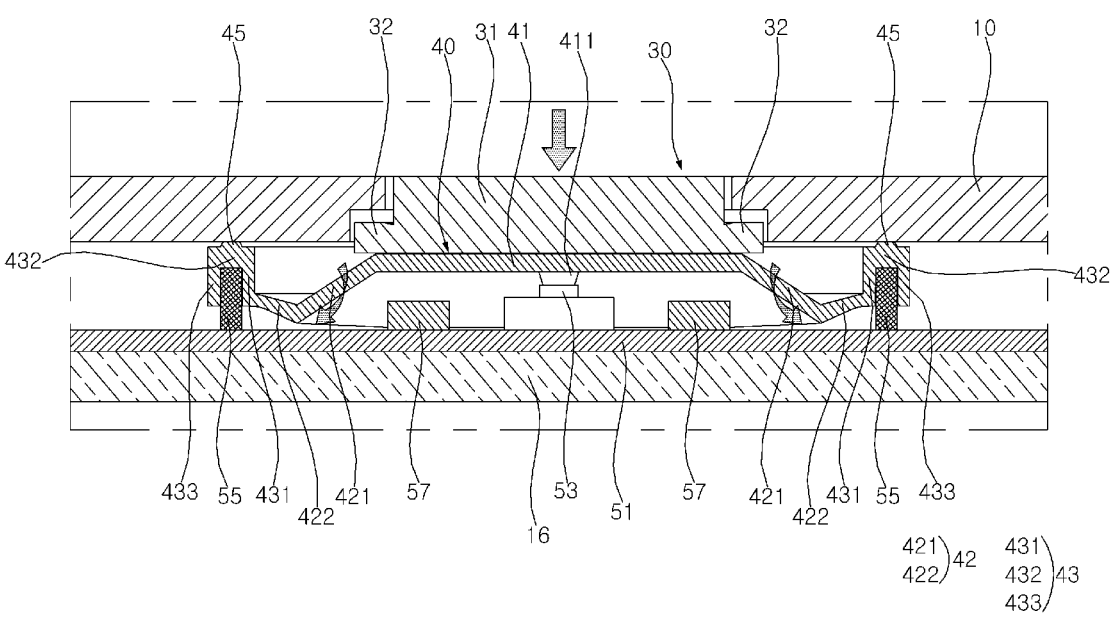

AEROSOL-GENERATING DEVICE

CROSS-REFERENCE TO RELATED APPLICATIONS

This application is the National Stage filing under 35 U.S.C. 371 of International Application No. PCT/KR2022/008893, filed on Jun. 22, 2022, which claims the benefit of earlier filing date and right of priority to Korean Application No. 10-2021-0081229, filed on Jun. 23, 2021, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various researches on aerosol-generating devices have been conducted.

DISCLOSURE OF INVENTION

Technical Problem

It is an object of the present disclosure to solve the above and other problems.

It is another object of the present disclosure to provide a sealing structure capable of preventing external material such as liquids from being introduced into an aerosol-generating device through a region around a button key.

It is still another object of the present disclosure to provide an aerosol-generating device capable of stably coupling and supporting a sealing structure around a button key.

Solution to Problem

In accordance with an aspect of the present disclosure for accomplishing the above objects, there is provided an aerosol-generating device including An aerosol-generating device comprising: a body with a buttonhole; a button key configured to be inserted into the buttonhole; a circuit board disposed inside the body to face button key; a seal disposed between the circuit board and the body, wherein the seal comprises a central portion positioned to face the button key and a peripheral portion surrounding a periphery of the buttonhole and in contact with the body; an actuator mounted between the circuit board and the central portion of the seal to provide elastic force to the central portion toward the button key; and a support projecting from the circuit board toward the peripheral portion for supporting the peripheral portion.

Advantageous Effects of Invention

According to at least one of embodiments of the present disclosure, it is possible to provide a sealing structure capable of preventing external material such as liquid from being introduced into an aerosol-generating device from a region surrounding a button key.

According to at least one of embodiments of the present disclosure, it is possible to provide an aerosol-generating device capable of stably coupling and supporting a sealing structure surrounding a button key.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which:

FIGS. 1 to 12 are views showing examples of an aerosol-generating device according to embodiments of the present disclosure.

BEST MODE FOR CARRYING OUT THE INVENTION

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

Referring to FIGS. 1 and 2, an aerosol-generating device 100 according the present disclosure may include at least one of a battery 11, a controller 12, a sensor 13, a cartridge 14, or a heater 15. At least one of the battery 11, the controller 12, the sensor 13, the cartridge 14, or the heater 15 may be disposed in the aerosol-generating device 100.

The insertion space 24 may be open to the outside at one side thereof. The stick 200 may be inserted into the insertion space 24. The stick 200 may be exposed to the outside of the aerosol-generating device 100 at one end thereof.

The heater 15 may heat a stick 200 inserted into the insertion space 24. The heater 15 may be disposed so as to surround an insertion space 24. The heater 15 may receive power from the battery 11 to generate heat. Alternatively, the heater 15 may be disposed in the insertion space 24. The heater 15 may generate heat by a magnetic field caused by an induction coil disposed therearound.

The cartridge 14 may be replaceably disposed in the aerosol-generating device 100. The cartridge 14 may store liquid therein. The cartridge 14 may heat the liquid stored therein to generate an aerosol. The cartridge 14 may supply the aerosol, which is generated in the cartridge 14, to the stick 200 inserted into the insertion space 24.

The battery 11 may supply power required to drive the components of the aerosol-generating device 100. The battery 11 may supply power to at least one of the controller 12, the sensor 13, or the heater 15. The battery 11 may supply power required to drive a display, a motor, and the like, which are mounted on the aerosol-generating device 100.

The controller 12 may control the overall operation of the aerosol-generating device 100. The controller 12 may control the operation of at least one of the battery 11, the heater 15, the cartridge 14, or the sensor 13. The controller 12 may check the state of the components of the aerosol-generating device 100 in order to determine whether or not the aerosol-generating device 100 is operable.

The sensor 13 may sense the temperature of the heater 15. The sensor 13 may be mounted adjacent to the heater 15. The controller 12 may control the temperature of the heater 15 based on the temperature of the heater 15, sensed by the sensor 13. The controller 12 may transmit information about the temperature of the heater 15 to a user through a user interface based on the temperature of the heater 15, which is sensed by the sensor 13.

A cap 20 may be coupled to the upper portion of the body 10 so as to cover the upper portion of the body 10. The cap 20 may be open at one side thereof so as to communicate with the insertion space 24. The cap 20 may include a cover 25 configured to open and close the insertion space 24.

A button key 30 may be disposed at one side of the body 10. A buttonhole 34 may be formed by opening one side of the body 10. The button key 30 may be inserted into the buttonhole 34. The button key 30 may be moved toward the inside of the body 10 when the button key 30 is pushed, and may be restored to the normal position otherwise. The button key 30 may be connected to the controller 12. A user may transmit commands to the controller 12 by pushing the button key 30. For example, when the button key 30 is pushed, the aerosol-generating device may be operated, or the operation of the aerosol-generating device may be halted.

Referring to FIGS. 3 to 5, a forward direction may be defined as a direction toward the outside of the body 10 from the inside of the body 10, and a rearward direction may be defined as a direction toward the inside of the body 10 from the outside thereof.

The buttonhole 34 may be formed by opening one side of the body 10. The button key 30 may be inserted into the buttonhole 34. The button key 30 may catch on the one side of the body 10 around the buttonhole 34, and may be prevented from being separated outwards from the body 10. The front surface portion 31 of the button key 30 may be exposed to the outside of the body 10 through the buttonhole 34. The rear surface portion 32 of the button key 30 may project further outwards than the periphery of the front surface portion 31 of the button key 30. The buttonhole 34 may include a button support groove 340. The button support groove 340 may be depressed outwards from the rear side of the buttonhole 34. The rear surface portion 32 of the button key 30 may be disposed in the button support groove 340, and may be supported by the body 10.

A seal 40 may be disposed inside the body 10. The seal 40 may be disposed between the body 10 and a circuit board 50. The seal 40 may be disposed between the button key 30 and the circuit board 51. The seal 40 may face or contact the rear surface portion 32 of the button key 30. The seal 40 may be in close contact with the body 10 around the buttonhole 34. The seal 40 may be made of an elastic material. For example, the seal 40 may be made of rubber or silicone.

The circuit board 51 may face the button key 30 in the body 10. Various electronic circuits may be mounted on the circuit board 51. The circuit board 51 may be electrically connected to the battery 11. The controller 12 may be mounted on the circuit board 51, or may be electrically connected to the circuit board 51. The circuit board 51 may receive commands, and may transmit electric signals to the controller 12. The circuit board 51 may be disposed parallel to the button key 30 and the buttonhole 34.

An actuator 53 may be mounted on the circuit board 51. The actuator 53 may face the button key 30. The actuator 53 may provide restoring force or elastic force toward the button key 30. The actuator 53 may provide forward restoring force or forward elastic force. The actuator 53 may be connected to the seal 40. The actuator 53 may be disposed between the circuit board 51 and the seal 40. When the button key 30 is pushed rearwards, the button key 30 may push the seal 40 and thus may move the seat 40 rearwards toward the actuator 53. When the seal 40 pushes the actuator 53, an electric signal corresponding to a command may be applied to the circuit board 51.

The seal 40 may include a central portion 41. The central portion 41 may be formed in the center of the seal 40. The central portion 41 may have a shape approximately corresponding to the rear surface portion 32 of the button key 30. For example, the central portion 41 may have a rectangular shape. The central portion 41 may face the rear surface portion 32 of the button key 30. The central portion 41 may be disposed parallel to the button key 30. The front surface of the central portion 41 may be brought into contact with the rear surface portion 32 of the button key 30.

A presser 411 may project from the rear surface of the central portion 41. The presser 411 may be connected to the actuator 53. The presser 411 may push the actuator 53. When the button key 30 pushes the central portion 41 toward the actuator 53, the actuator 53 may be operated by the presser 411. When the presser 411 pushes the actuator 53, the actuator 53 may provide the presser 411 with restoring force and thus may move the seal 40 and the button key 30 forwards to the normal position thereof.

The seal 40 may include a connecting portion 42. The connecting portion 42 may be formed between the center of the seal 40 and the periphery thereof. The connecting portion 42 may be positioned between the central portion 41 and the peripheral portion 43 so as to connect the central portion 41 to the peripheral portion 43. The connecting portion 42 may include a portion that obliquely extends outwards and rearwards from the central portion 41. When the button key 30 pushes the central portion 41, the connecting portion 42 may be deformed. When the button key 30 in the state of pushing the central portion 41 is separated from the central portion 41, the connecting portion 42 may be restored to the normal position thereof.

The seal 40 may include the peripheral portion 43. The peripheral portion 43 may be formed at the periphery of the seal 40. The peripheral portion 43 may have a shape that extends along the periphery of the buttonhole 34, and may have a perimeter larger than the perimeter of the buttonhole 34. For example, the peripheral portion 43 may be formed so as to have a rectangular shape. The peripheral portion 43 may be brought into close contact with the rear surface of the body 10 around the buttonhole 34. The peripheral portion 43 may be disposed further outwards than the periphery of the buttonhole 34.

The seal 40 may have therein an insertion groove 44. The insertion groove 44 may be formed near the periphery of the seal 40. The peripheral portion 43 may surround the insertion groove 44. The insertion groove 44 may be open rearwards toward the circuit board 51. The insertion groove 44 may have a shape extending along the periphery of the seal 40. For example, the insertion groove 44 may have a rectangular shape. A support 55 may be inserted into the insertion groove 44 so as to be surrounded by the peripheral portion 43 and to be in close contact therewith.

The seal 40 may include a sealing protrusion 45. The sealing protrusion 45 may project forwards toward the body 10 from the peripheral portion 43. The sealing protrusion 45 may extend along the peripheral portion 43. The sealing protrusion 45 may be positioned in the peripheral portion 43 so as to correspond to the insertion groove 44. The sealing protrusion 45 may be positioned parallel to the insertion groove 44. The sealing protrusion 45 may be positioned parallel to the support 55. The sealing protrusion 45 may be disposed further outwards than the periphery of the buttonhole 34.

The support 55 may be coupled or fixed to the circuit board 51. The support 55 may project from the circuit board 51. The support 55 may project toward the peripheral portion 43. The support 55 may support the peripheral portion 43. The support 55 may extend along the peripheral portion 43, and may project therefrom. The support 55 may have a shape that extends along the periphery of the buttonhole 34, and may have a perimeter greater larger the perimeter of the buttonhole 34. The support 55 may be disposed parallel to the sealing protrusion 45. The support 55 may support the sealing protrusion 45.

A light source 57 may be mounted on the circuit board 51. The light source 57 may be electrically connected to the circuit board 51. The light source 57 may emit light. The light emitted from the light source 57 may be supplied to the outside of the body 10 through the gap between the button key 30 positioned in the buttonhole 34 and the body 10. The button key 30 may be transparent/semi-transparent, or may include a transparent/semi-transparent portion such that the light emitted from the light source 57 is transmitted to the outside of the body 10. The light source 57 may be disposed inside the support 55. The seal 40 may cover the front of the light source 57. The seal 40 may be transparent/semi-transparent so as to allow light to be transmitted therethrough.

Referring to FIGS. 6 and 7, the seal 40 may include the central portion 41 and the peripheral portion 43. The central portion 41 may have a flat shape. The peripheral portion 43 may be formed outside the central portion 41. The seal 40 may include the connecting portion 42. The connecting portion 42 may be disposed between the central portion 41 and the peripheral portion 43 so as to connect the central portion 41 to the peripheral portion 43.

The peripheral portion 43 may include at least one of a first peripheral portion 431, a second peripheral portion 432, or a third peripheral portion 433. The connecting portion 42 may include at least one of a first connecting portion 421 and a second connecting portion 422.

The first peripheral portion 431 may extend forwards from the outer peripheral end of the second connecting portion 422. The first peripheral portion 431 may extend in a direction intersecting the direction in which the second connecting portion 422 extends. The first peripheral portion 431 may extend forwards and backwards. The first peripheral portion 431 may extend along the periphery of the seal 40. For example, the first peripheral portion 431 may have a rectangular shape. The first peripheral portion 431 may connect the inner peripheral end of the second peripheral portion 432 to the outer peripheral end of the second connecting portion 422. The first peripheral portion 431 may be formed further outwards than the central portion 41.

The second peripheral portion 432 may extend outwards from the front end of the first peripheral portion 431. The second peripheral portion 432 may extend in a direction intersecting the forward direction, in which the first peripheral portion 431 projects. The second peripheral portion 432 may define a surface parallel to the central portion 41. The second peripheral portion 432 may extend along the periphery of the seal 40. For example, the second peripheral portion 432 may have a rectangular shape. The second peripheral portion 432 may connect the front end of the first peripheral portion 431 to the front end of the third peripheral portion 433.

The third peripheral portion 433 may extend rearwards from the peripheral end of the second peripheral portion 432. The third peripheral portion 433 may extend in a direction intersecting the direction in which the second peripheral portion 432 extends. The third peripheral portion 433 may have a shape corresponding to the shape of the first peripheral portion 431. The third peripheral portion 433 may be disposed outside the first peripheral portion 431. The third peripheral portion and the first peripheral portion 431 may be formed so as to be parallel to each other. The outer circumferential surface of the first peripheral portion 431 may face the inner circumferential surface of the third peripheral portion 433.

The insertion groove 44 may be surrounded by the first peripheral portion 431, the second peripheral portion, and the third peripheral portion 433. The two lateral sides of the insertion groove 44 may be surrounded by the first peripheral portion 431 and the third peripheral portion 433. The front side of the insertion groove 44 may be covered by the second peripheral portion 432. The rear side of the insertion groove 44 may be open.

The first connecting portion 421 may obliquely extend outwards and rearwards from the outer peripheral end of the central portion 41. The first connecting portion 421 may connect the outer peripheral end of the central portion 41 to the inner peripheral end of the second connecting portion 422. The first connecting portion 421 may extend in a direction intersecting the central portion 41. The first connecting portion 421 may extend so as to expand moving toward the rear side from the front side. The first connecting portion 421 may have the form of a truncated body, such as a truncated quadrangular pyramid or a truncated cone.

The second connecting portion 422 may extend outwards from the outer peripheral end of the first connecting portion 421. The second connecting portion 422 may extend in a direction intersecting the direction in which the first connecting portion 421 extends. The second connecting portion 422 may connect the outer peripheral end of the first connecting portion 421 to the rear end of the first peripheral portion 431. The second connecting portion 422 may be positioned further rearwards than the central portion 41.

The sealing protrusion 45 may project from the second peripheral portion 432 so as to be convex forwards. The sealing protrusion 45 may extend along the second peripheral portion 432. The sealing protrusion 45 may be positioned at the second peripheral portion 432 so as to be aligned with the insertion groove 44. The sealing protrusion 45 may be disposed so as to be parallel to the insertion groove 44 in the forward/backward direction. The sealing protrusion 45 may overlap the insertion groove 44 in the forward/backward direction.

Referring to FIGS. 8 to 10, the seal 40 may be disposed in front of the circuit board 51. The seal 40 may be coupled to the support 55. The support 55 may support the peripheral portion 43.

The support 55 may be inserted into the insertion groove 44 through the rear open side of the insertion groove 44. The support 55 may have a width equal to or greater than the width of the insertion groove 44. The support 55 may be fitted into the insertion groove 44 in an interference-fit manner. The peripheral portion 43 may surround the support 55 inserted into the insertion groove 44. The peripheral portion 43 may extend in the direction in which the insertion groove 44 extends, thereby defining the periphery.

The peripheral portion 43 may cover the support 55 in the state of being in close contact therewith. The first peripheral portion 431 and the third peripheral portion 433 may cover the two lateral sides of the support 55 in the state of being in close contact therewith. The second peripheral portion 432 may cover the front side of the support 55 in the state of being in close contact therewith. The peripheral portion 43 may be fixed to the support 55.

The support 55 may be longer than the insertion groove 44 in the forward/backward direction. When the support 55 is inserted into the insertion groove 44, the support 55 may forwardly space the seal 40 apart from the circuit board 51. The first peripheral portion, the first connecting portion 421, and the second connecting portion 422 may be forwardly spaced apart from the circuit board 51 by means of the support 55. The portion at which the peripheral portion 43 is connected to the connecting portion 42 may be spaced apart from the circuit board 51 by means of the support 55.

The light source 57 may be mounted on the circuit board 51. The light source 57 may include a plurality of light sources. The light sources 57 may face forwards. The seal 40 may cover the front sides of the light sources 57. The presser 411 may project rearwards from the central portion 41, and may be connected to the actuator 53. The presser 411 may push the actuator 53 rearwards. The actuator 53 may provide the presser 411 and the central portion 41 with forward restoring force.

Referring to FIG. 11, the sealer 40 coupled to the support 55 may be inserted into the body 10. A circuit board support 16 may be mounted inside the body 10. The circuit board support 16 may face the inner surface of the body 10. The circuit board 51 may slide on the circuit board support 16, and may be mounted between the circuit board support 16 and the inner surface of the body 10. The circuit board 51 may slide together with the seal 40. The circuit board 51 may be fixed to or supported by the circuit board support 16 at a position corresponding to the button key 30. The central portion 41 may face the button key 30, and the peripheral portion 43 and the sealing protrusion 45 may be disposed outside the button key 30 and the buttonhole 34, and may be in close contact with the inner surface of the body 10.

The rear surface portion 32 of the button key 30 may be disposed so as to be flush with the inner surface of the body 10, or may be disposed further forwards than the inner surface of the body 10. While the seal 40 is moved, the sealing protrusion 45 may be in contact with the inner surface of the body, and the central portion 41 may be spaced apart from the inner surface of the body 10. The peripheral portion 43 may be fixed to the support 55 in the state of surrounding the support 55.

Accordingly, it is possible to prevent separation of the seal 40 from the body 10 when the circuit board 51 and the seal 40 are mounted inside the body 10.

Referring to FIGS. 12 and 13, when the button key 30 is pushed, the button key 30 may be moved rearwards, and may then push the central portion 41 rearwards. When the central portion 41 is moved rearwards, the presser 411 may push the actuator 53. The actuator 53 may provide the presser 411 and the central portion 41 with forward elastic force.

When the central portion 41 is moved rearwards, the connecting portion 42 may be tilted rearwards with respect to the peripheral portion 43. When the central portion 41 is moved rearwards, the central portion 41 may transmit rearward force to the first connecting portion 421, and the first connecting portion 241 may transmit rearward and outward force to the second connecting portion 422. The second connecting portion 422 may be subjected to stress from the first connecting portion 421, and the peripheral portion 43 may be fixed to the support 55. Consequently, the second connecting portion 422 may be tilted rearwards with respect to the rear end of the first peripheral portion 431.

The peripheral portion 43 may surround the support 55. The support 550 may be forcibly inserted into the insertion groove 44 (see FIG. 9) in the peripheral portion 43 so as to hold the peripheral portion 43. The support 55 may be disposed parallel to the sealing protrusion 45. The support 55 may support the peripheral portion 43 and the sealing protrusion 45 in the forward direction. The sealing protrusion 45 may have elasticity. The sealing protrusion 45 may be pressed between the support 55 and the body 10 in the forward/backward direction.

The light source 57 may be surrounded by the seal 40, the circuit board 51, and the support 55. The light emitted from the light source 57 may be transmitted through the seal 40, and may be provided to the outside of the body 10 through the gap between the button key 30 and the body 10. Alternatively, the light emitted from the light source 57 may be provided to the outside of the body 10 through the seal 40 and the button key 30. The seal 40 may diffuse light. The seal 40 may include therein diffuser beads configured to scatter light. The seal 40 may be coupled to a diffuser sheet configured to scatter light. The light emitted from the light source 57 may be transmitted and diffused through the seal 40, and may be provided to the button key 30 and the buttonhole 34.

Consequently, it is possible to prevent the seal 40 from being separated toward the outside. Furthermore, it is possible to efficiently prevent a material such as liquid introduced through the gap between the button key 30 and the body 10 from entering the inside through the gap between the seal 40 and the body 10. In addition, it is possible to protect components such as the circuit board 51 and the light source 57 from external substances. Furthermore, it is possible to uniformly provide light to the outside, even when the light source 57 is eccentrically positioned or may emit light in a deviated direction.

Referring to FIGS. 1 to 12, an aerosol-generating device 100 according to one aspect of the present disclosure includes a body 10 with a buttonhole 34, a button key 30 configured to be inserted into the buttonhole 34, a circuit board 51 disposed inside the body 10 to face the button key 30, a seal 40 disposed between the circuit board 51 and the body 10, the seal 40 including a central portion 41 positioned so as to face the button key 30 and a peripheral portion 43 surrounding a periphery of the buttonhole 34 and in contact with the body 10, an actuator 53 mounted between the circuit board 51 and the central portion 41 of the seal 40 to provide elastic force to the central portion 41 toward the button key 30, and a support 55 projecting from the circuit board 51 toward the peripheral portion 43 for supporting the peripheral portion 43.

In addition, according to another aspect of the present disclosure, the support 55 may project to have a shape that extends along the peripheral portion 43.

In addition, according to another aspect of the present disclosure, the peripheral portion 43 may surround the support 55, and may be coupled to the support 55.

In addition, according to another aspect of the present disclosure, the seal 40 may have an insertion groove 44 defined by the peripheral portion 43 to open toward the support 55, wherein the support 55 may be configured to be inserted into the insertion groove 44.

In addition, according to another aspect of the present disclosure, the seal 40 may include a sealing protrusion 45 extending along the peripheral portion 43 and projecting toward the body 10 from the peripheral portion 43 to be in close contact with the body 10 around the buttonhole 34.

In addition, according to another aspect of the present disclosure, the sealing protrusion 45 may be disposed parallel to the support 55 to overlap the support 55.

In addition, according to another aspect of the present disclosure, the seal 40 may include a connecting portion 42 extending outwardly and obliquely from a periphery of the central portion 41 in a direction opposite to the button key 30 wherein the connecting portion 42 connects the central portion 41 to the peripheral portion 43.

In addition, according to another aspect of the present disclosure, the connecting portion 42 may include a first connecting portion 421, extending outwardly and obliquely from the periphery of the central portion 41 in the direction opposite to the button key 30, and a second connecting portion 422, extending in a direction intersecting the first connecting portion 421 and connecting the first connecting portion 421 to the peripheral portion 43.

In addition, according to another aspect of the present disclosure, the portion at which the peripheral portion 43 is connected to the connecting portion 42 may be spaced apart from the circuit board 51 by the support 55.

In addition, according to another aspect of the present disclosure, when the button key 30 is moved to push the central portion 41 toward the actuator 53, the connecting portion 42 may be tilted toward the circuit board 51 with respect to the peripheral portion 43.

In addition, according to another aspect of the present disclosure, the aerosol-generating device may further include a light source 57 mounted on the circuit board 51 and configured to emit light.

In addition, according to another aspect of the present disclosure, the light source 57 may be disposed inside the support 55, wherein the seal may cover one side of the light source.

In addition, according to another aspect of the present disclosure, the seal 40 may be light-transmissive and light-diffusive.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An aerosol-generating device comprising:

a body with a buttonhole;

a button key configured to be inserted into the buttonhole;

a circuit board disposed inside the body to face the button key;

a seal disposed between the circuit board and the body, wherein the seal comprises a central portion positioned to face the button key and a peripheral portion surrounding a periphery of the buttonhole and in contact with the body;

an actuator mounted between the circuit board and the central portion of the seal to provide elastic force to the central portion toward the button key; and a support projecting from the circuit board toward the peripheral portion and toward the body for supporting the peripheral portion, wherein the support is inserted into the peripheral portion.

2. The aerosol-generating device according to claim 1, wherein the support projects to have a shape that extends along the peripheral portion.

3. The aerosol-generating device according to claim 1, wherein the peripheral portion surrounds the support and is coupled to the support.

4. The aerosol-generating device according to claim 3, wherein the seal has an insertion groove defined by the peripheral portion to open toward the support, wherein the support is configured to be inserted into the insertion groove.

5. The aerosol-generating device according to claim 1, wherein the seal further comprises a sealing protrusion extending along the peripheral portion and projecting toward the body from the peripheral portion to be in close contact with the body around the buttonhole.

6. The aerosol-generating device according to claim 5, wherein the sealing protrusion is disposed parallel to the support to overlap the support.

7. The aerosol-generating device according to claim 1, wherein the seal further comprises a connecting portion extending outwardly and obliquely from a periphery of the central portion in a direction opposite to the button key, wherein the connecting portion connects the central portion to the peripheral portion.

8. The aerosol-generating device according to claim 7, wherein the connecting portion comprises:
   a first connecting portion extending outwardly and obliquely from the periphery of the central portion in the direction opposite to the button key; and
   a second connecting portion extending in a direction intersecting the first connecting portion and connecting the first connecting portion to the peripheral portion.

9. The aerosol-generating device according to claim 7, wherein a portion at which the peripheral portion is connected to the connecting portion is spaced apart from the circuit board by the support.

10. The aerosol-generating device according to claim 7, wherein, when the button key is moved to push the central portion toward the actuator, the connecting portion is tilted toward the circuit board with respect to the peripheral portion.

11. The aerosol-generating device according to claim 1, further comprising a light source mounted on the circuit board and configured to emit light.

12. The aerosol-generating device according to claim 11, wherein the light source is disposed inside the support, wherein the seal covers one side of the light source.

13. The aerosol-generating device according to claim 11, wherein the seal is light-transmissive and light-diffusive.

14. The aerosol-generating device according to claim 7, wherein:
   the connecting portion comprises:
      a first connecting portion, and
      a second connecting portion configured to extend outwards from an outer peripheral end of the first connecting portion;
   the peripheral portion comprises:
      a first peripheral portion configured to extend forwards from an outer peripheral end of the second connecting portion,
      a second peripheral portion configured to extend rearwards from a peripheral end of the first peripheral portion, and
      a third peripheral portion configured to extend rearwards from a peripheral end of the second peripheral portion; and
   the seal comprises:
      an insertion groove surrounded by the first peripheral portion, the second peripheral portion, and the third peripheral portion.

* * * * *